Feb. 18, 1930.  T. W. CASE  1,747,287
SOURCE OF LIGHT
Original Filed Nov. 19, 1927
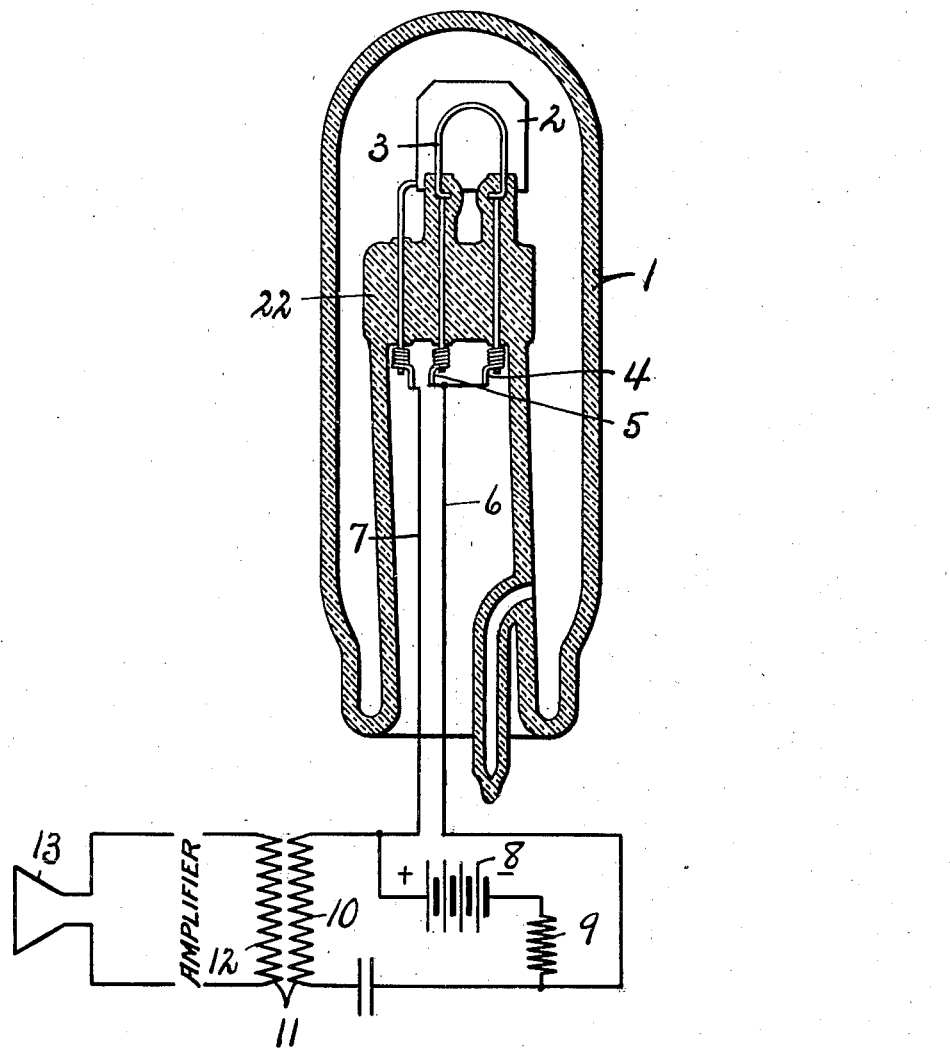

Patented Feb. 18, 1930

1,747,287

UNITED STATES PATENT OFFICE

THEODORE WILLARD CASE, OF AUBURN, NEW YORK, ASSIGNOR TO CASE RESEARCH LABORATORY, INC., OF AUBURN, NEW YORK, A CORPORATION OF NEW YORK

SOURCE OF LIGHT

Application filed November 19, 1927, Serial No. 234,535. Renewed July 9, 1929.

This invention relates to certain new and useful improvements in sources of light for producing a photographic record of light wave variations produced by electrical variations corresponding to sound wave variations.

I have discovered that in the use of a glow lamp comprising two spaced electrodes, the negative one of which is provided with a coating of an alkaline earth oxide or metal, for producing a photographic record, that the electrodes become heated to a comparatively high temperature, which fact is detrimental to the most effective operation of the lamp, and for that reason it is desirable and quite essential that the electrodes should be surrounded by a gas of high heat conductivity in order to maintain the electrodes as cool as possible.

Such a gas is hydrogen. However, hydroxen has certain disadvantages when used for producing a photographic record in that the resultant light is not highly actinic for photographic purposes, and a gas such as nitrogen is more effective for the purpose.

I have discovered that if a small percentage of nitrogen is added to hydrogen gas in the bulb enclosing the electrodes, for instance one or two per cent of nitrogen and preferably not more than five per cent, that a light of greatly improved characteristics for photographic purposes is produced. The heat conductivity of nitrogen is, however, considerably less than that of hydrogen, and for that reason it is desirable to use only a small quantity of nitrogen.

Nevertheless, certain advantages may be obtained when an amount as great as 25 per cent of nitrogen is included in the mixture of gases.

Other objects and advantages relate to the details of the light source, all as will more fully appear from the following description taken in connection with the accompanying drawings, in which:—

The figure illustrates a sectional view of a source of light of this invention with suitable circuits diagrammatically shown.

The source of light as herein illustrated comprises a bulb —1—, the stem —22— of which supports a pair of spaced electrodes —2— and —3—. The anode or plate —2— may be formed of nickel and a satisfactory size for the plate is one-quarter of an inch by one-eighth of an inch, and .005 of an inch thick. The cathode —3— may, for instance, be formed of molybdenum wire, or perhaps platinum wire, and is preferably in the form of an inverted U, and this form seems to be important because the source of light retains its efficiency for longer periods of time than when the cathode is straight, and this seems to result from the fact that each leg of the U-shaped cathode sputters material from the oxide coating hereinafter described, onto the opposite leg, thereby causing a considerable increase in the life of the material.

The U-shaped cathode —3— is attached at its ends to two leads —4— and —5— so that it may be used as a filament and may be heated, if desired, by the passage of an electric current therethrough.

However, in the actual use of the structure for producing a photographic record the two leads —4— and —5— are connected by a single conductor —6— to one side of the modulated circuit and the anode —2— is connected by conductor —7— to the other side of the modulated circuit, and the lamp is maintained continuously lighted, as for instance by a battery —8—, the battery circuit including a comparatively high resistance —9—. Preferably, the battery —8— and resistance —9— are in shunt with the secondary —10— of a transformer —11—, which secondary is connected in circuit with the conductors —6— and —7—. The primary —12— of the transformer may be connected through any desired number of stages of amplification with a microphone 13 for modulating the circuit in accordance with sound variations.

The cathode is provided with a coating of an alkaline earth oxide, preferably barium oxide, altho strontium oxide or calcium oxide may be used with less effective results. This oxide may be applied directly to the wire constituting the cathode —3—, and after being placed in the bulb —1—, the bulb is evacuated to a high degree and the cathode with its oxide coating is then heated to a comparatively high temperature at which the cathode becomes a dull red.

This feature of heating the cathode with its oxide coating to a dull red in a high vacuum is of great importance in activating the coating on the wire of the cathode, and also in the production of a cathode of unusual stability and unusual effectiveness in the production of a constant and uniform light which will vary instantaneously and sharply in accordance with variations in an electric circuit connected between the cathode —3— and the anode —2—.

A mixture of hydrogen and nitrogen is then admitted to the bulb —1—, the proportions of the gases in the mixture may vary considerably, but as previously suggested, 98% of hydrogen and two per cent of nitrogen constitutes a preferred mixture. Gas is admitted to the bulb —1— until a pressure is reached at which a concentrated glow is produced about the cathode separate from the anode glow when the lighting circuit for the lamp includes a source of potential of 350 or 400 volts and a comparatively high resistance, as for instance a resistance of 10,000 ohms. The amount of nitrogen included in the gaseous filling of the tube is not sufficient to materially reduce the capacity of the gas for rapidly transferring heat from the cathode so as to maintain it in a comparatively cool condition, but is still sufficient to introduce into the light considerable violet which is highly actinic for photographic purposes.

The essential feature of this invention consists in the combination with a tube containing a pair of spaced electrodes, the cathode one of which has an activated coating of an alkaline earth metal or oxide of a gaseous filling for the tube which consists mainly of a gas of high heat conductivity combined with a smaller percentage of a gas which produces a light containing a substantial proportion of the violet end of the spectrum.

Altho I have described particular percentages of the gases constituting the gaseous mixture within the tube, and have described preferred limits, still the nitrogen content of the gas may reach as high as 25 percent while considerable benefit is still obtained in the production of an improved light for photographic purposes, and for that reason I do not desire to limit myself to the form or relation of the parts of the structure or the particular percentages of the gases constituting the mixture. Further, although I have described a combination of hydrogen and nitrogen it is essential to this invention that the major portion of the gaseous mixture shall consist of hydrogen and various other gases may be substituted for the nitrogen content of the mixture so long as such gases emit light more abundant in the green, blue or violet than in the red, orange or yellow, as the former colors are more actinic for photographic purposes and are included in the mixture for that reason.

I claim:

1. A source of light for producing a photographic record comprising a bulb containing a pair of spaced electrodes, the negative one of which is provided with a coating comprising an alkaline earth metal, hydrogen within the bulb and a comparatively small percentage of nitrogen within the bulb.

2. A source of light for producing a photographic record comprising a bulb containing a pair of spaced electrodes, the negative one of which is provided with a coating comprising an alkaline earth metal, hydrogen within the bulb and a comparatively small percentage of nitrogen within the bulb, the mixture of hydrogen and nitrogen being at such a pressure that an intense glow is concentrated about the negative electrode.

3. A source of light for producing a photographic record comprising a bulb containing a pair of spaced electrodes, the negative one of which is provided with a coating comprising an alkaline earth metal, and a mixture of hydrogen and nitrogen within the bulb, the nitrogen constituting the lesser percentage of the mixture.

4. A source of light for producing a photographic record comprising a bulb containing a pair of spaced electrodes, the negative one of which is provided with a coating comprising an alkaline earth metal and a mixture of hydrogen and nitrogen within the bulb, the nitrogen constituting from one to five per cent of the mixture.

5. A source of light for producing a photographic record comprising a bulb containing a pair of spaced electrodes, the negative one of which is provided with a coating comprising an alkaline earth metal, and a mixture of hydrogen and nitrogen within the bulb, the nitrogen constituting from one to twenty-five per cent of the mixture.

6. A gas discharge bulb containing electrodes, and hydrogen forming the major part of a gas mixture, the other gas or gases being any which emit light more abundant in the green, blue or violet than in the red, orange or yellow.

7. A gas discharge bulb containing electrodes, and hydrogen forming 75 per cent of a gas mixture, the other gas or gases being any which emit light more abundant in the green, blue or violet than in the red, orange or yellow.

8. A gas discharge bulb containing electrodes, and hydrogen forming 90% of a gas mixture, the other gas or gases being any which emit light more abundant in the green, blue or violet than in the red, orange or yellow.

In witness whereof I have hereunto set my hand this 12th day of November, 1927.

THEODORE WILLARD CASE.